United States Patent [19]
Merkin

[11] Patent Number: 6,119,248
[45] Date of Patent: Sep. 12, 2000

[54] OPERATING SYSTEM NOTIFICATION OF CORRECTABLE ERROR IN COMPUTER INFORMATION

[75] Inventor: Cynthia M. Merkin, Georgetown, Tex.

[73] Assignee: Dell USA L.P., Austin, Tex.

[21] Appl. No.: 09/013,809

[22] Filed: Jan. 26, 1998

[51] Int. Cl.[7] .................................................. G06F 11/00
[52] U.S. Cl. ........................... 714/52; 714/723; 714/768
[58] Field of Search ........................... 714/82, 768, 6–8, 714/764, 2, 5, 10, 35, 42, 52, 48–57, 723, 746, 751–758; 709/224; 713/324; 371/40.1, 40.2

[56] References Cited

U.S. PATENT DOCUMENTS

| | | | |
|---|---|---|---|
| 4,077,028 | 2/1978 | Lui et al. | 340/146.1 |
| 4,228,496 | 10/1980 | Katzman et al. | 364/200 |
| 4,356,550 | 10/1982 | Katzman et al. | 364/200 |
| 4,358,848 | 11/1982 | Patel | 371/39 |
| 4,542,454 | 9/1985 | Brcich et al. | 711/106 |
| 4,608,687 | 8/1986 | Dutton | 371/10 |
| 4,947,369 | 8/1990 | Thoma et al. | 364/900 |
| 4,979,174 | 12/1990 | Cheng et al. | 371/41 |
| 5,072,450 | 12/1991 | Helm et al. | 371/21.6 |
| 5,177,747 | 1/1993 | Capps, Jr. et al. | 371/51.1 |
| 5,263,032 | 11/1993 | Porter et al. | 371/40.2 |
| 5,287,363 | 2/1994 | Wolf et al. | 371/21.1 |
| 5,289,477 | 2/1994 | Lenta et al. | 371/37.7 |
| 5,369,650 | 11/1994 | Kirk et al. | 371/40.1 |
| 5,430,742 | 7/1995 | Jeddeloh et al. | 371/40.1 |
| 5,455,939 | 10/1995 | Rankin et al. | 714/6 |
| 5,488,691 | 1/1996 | Fuoco et al. | 395/185.05 |
| 5,490,155 | 2/1996 | Abdoo et al. | 371/40.1 |
| 5,533,035 | 7/1996 | Saxena et al. | 371/38.1 |
| 5,555,250 | 9/1996 | Walker et al. | 371/40.1 |
| 5,572,662 | 11/1996 | Ohta et al. | 395/182.09 |
| 5,623,506 | 4/1997 | Dell et al. | 371/40.1 |
| 5,745,508 | 4/1998 | Prohofsky | 371/40.1 |
| 5,841,795 | 11/1998 | Olarig et al. | 371/40.13 |
| 5,919,264 | 6/1999 | Reneris | 713/324 |
| 5,978,952 | 11/1999 | Hayek et al. | 714/764 |
| 5,978,953 | 11/1999 | Olarig | 714/768 |
| 5,991,806 | 11/1999 | McHann, Jr. | 709/224 |

OTHER PUBLICATIONS

*Advanced Configuration and Power Interface Specification*, © 1996, Intel Corporation, Microsoft Corporation, Toshiba Corp.

*Primary Examiner*—Joseph E. Palys
*Assistant Examiner*—Rijue Mai
*Attorney, Agent, or Firm*—Skjerven Morrill MacPherson LLP; David G. Dolezal

[57] ABSTRACT

A computer system utilizing the Advance Configuration and Power Interface (ACPI) Standard to notify an ACPI compliant operating system of a detected correctable error. The computer system includes and error check circuit that detects correctable and non correctable errors in computer information flowing between the processor and a RAM. The error correction circuit provides a CE signal in response to detecting a correctable error. The computer system includes a register block circuit, that when enabled, generates an SCI to the processor in response to receiving the SCI. The processor accesses a status register of the SCI to determine that the error signal was sent. An ACPI driver of the operating system interprets ACPI control methods to direct the processor to perform the functions of the control method to obtain an address and syndrome of the information unit having the detected correctable error.

29 Claims, 4 Drawing Sheets

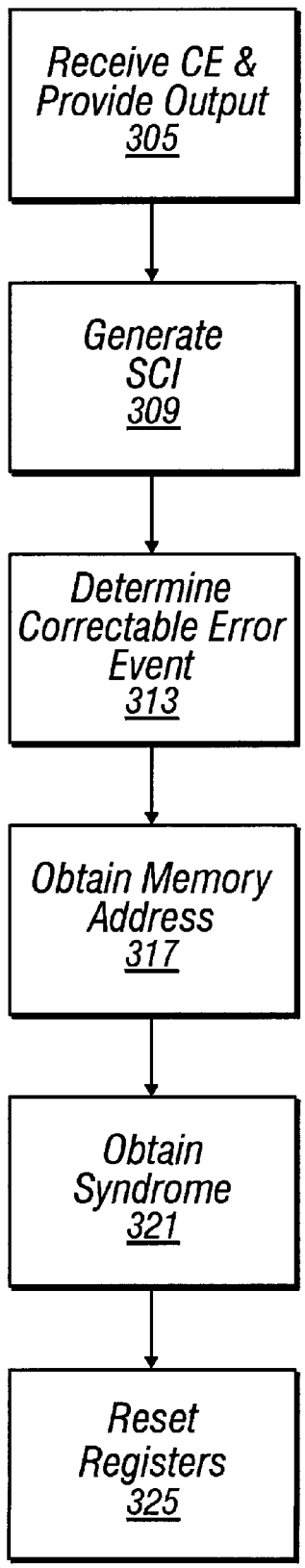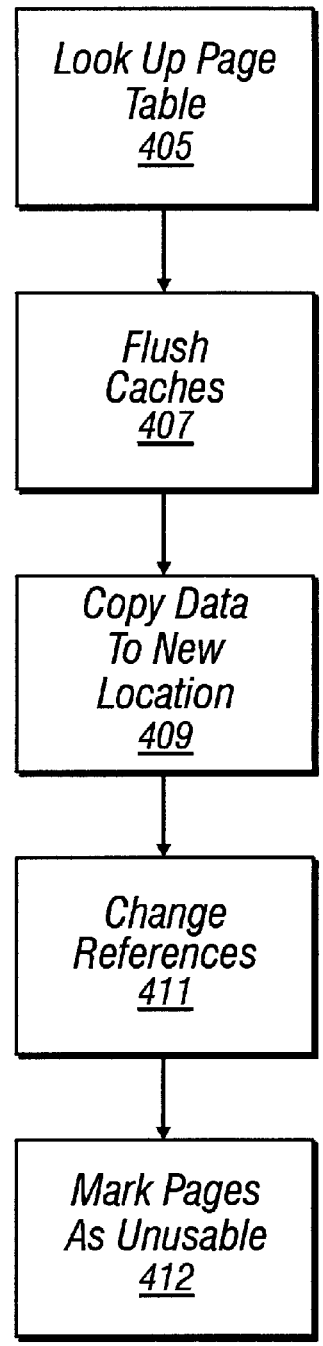
FIG. 3
FIG. 4

```
METHOD (\_GPE. _LXX) {
    NOTIFY (\ECC , 2);
}
```

FIG. 5A

```
DEVICE (ECC)    {
    METHOD (EAD) {...}
    METHOD (SYN) {...}
    METHOD (RST) {...}
}
```

FIG. 5B

OPERATING SYSTEM NOTIFICATION OF CORRECTABLE ERROR IN COMPUTER INFORMATION

BACKGROUND OF THE INVENTION

1. Field of the Invention

The invention relates to computer systems and more particularly to notifying an operating system of a detected correctable error in computer information.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM) compatible PC systems, include desktop, floor standing, or portable versions. A typical PC system includes such hardware components as a processor, associated memory such as RAM and ROM, control logic, and a number of peripheral devices that provide input and output for the system. Such peripheral devices often include floppy and hard disk drives, CD-ROM drives, network capability cards, terminal devices, modems, sound devices, voice recognition devices, electronic pen devices, and other mass storage devices such as tape drives and DVDs.

In a computer system, computer information transmitted to and from a memory may be erroneous due to a variety of factors, such as faulty components, inadequate design tolerances, or noise in the busses providing the computer information. Error check circuits such as error correction and detection circuitry can be incorporated into a computer system to detect both single bit errors and multiple bit errors in a unit of computer information. An error check circuit may also correct the correctable errors such as single bit errors. An example of an error check circuit is found in U.S. Pat. No. 5,369,650, issued Nov. 29, 1994, and naming David L. Kirk and Jay W. Gustin as inventors. Another example may be found in U.S. Pat. No. 5,490,155, issued Feb. 6, 1996, and naming David G. Abdoo and David Cabello as inventors.

The Advanced Configuration and Power Interface (ACPI) specification standard is a computer system standard for power management in a computer system by the operating system of a computer system. An operating system implementing the ACPI standard can utilize advanced power management applications such as environmental control and sleep state control by utilizing relatively inexpensive hardware support that also conforms to the specification. Such a system standardizes the gathering of power management information and unifies the power management algorithms, thus reducing redundant investment in power management technology. The ACPI standard is set forth in the *Advanced Configuration and Power Interface Specification* by INTEL, MICROSOFT, AND TOSHIBA, Rev. 1.0, Dec. 22, 1996, which is hereby incorporated by reference in its entirety.

SUMMARY OF THE INVENTION

Utilizing the ACPI standard in notifying a computer system operating system of a detected correctable error advantageously allows for the simplification of the hardware-software interface between an error check circuit and the operating system of a computer system. Such a system also allows for the standardization the notifying of an operating system of a detected correctable error, thereby allowing such a system to be implemented in computer systems having a variety of types of computer information handling hardware components.

In one aspect of the invention, a computer system includes a processor, a memory, and an error check circuit operably coupled to the memory and to the processor. The error check circuit detects correctable errors in computer information. The error check circuit provides an error signal indicative of a detected correctable error. The computer system further includes a register circuit. The register circuit includes a status register and enable register. The status register includes a plurality of bit-fields. The value of one of the bit-fields is responsive to the error signal. The enable register includes a plurality of bit-fields. Each bit-field of the plurality of bit-fields of the enable register corresponds to a bit-field of the plurality of bit-fields of the status register. One of the bit-fields of the enable register is corresponding to the one of the bit-fields of the status register whose value is responsive to the error signal. When the one of the bit-fields of the enable register contains a value indicating enablement, an interrupt to the processor is generated in response to the register circuit receiving the error signal.

In another aspect of the invention, a method for notifying a computer system operating system of a detected correctable error includes detecting a correctable error in computer information and providing an indication thereof in a bit-field of a status register. The method also includes generating an interrupt to a processor implementing an operating system if a bit-field of an enable register corresponding the bit-field of the status register indicates enablement. The method further includes accessing the status register to determine that the interrupt was generated in response to the detection of a correctable error.

In another aspect of the invention, a computer system includes a processor, a memory, and an error check circuit. The processor executes code for the implementation of an operating system that implements an advanced configuration and power interface (ACPI) standard. The error check circuit is operably coupled to the memory and to the processor. The error check circuit is capable of detecting correctable errors in computer information. The error check circuit provides an error signal indicative of a detected correctable error. The computer system further includes a register block circuit compatible with the ACPI standard. In response to receiving the error signal, the register block circuit, when enabled, provides an output signal to notify the operating system of the detected correctable error.

BRIEF DESCRIPTION OF THE DRAWINGS

The present invention may be better understood, and its numerous objects, features, and advantages made apparent to those skilled in the art by referencing the accompanying drawings.

FIG. 3 shows one embodiment of the operation of a computer system in notifying the operating system of a detected correctable error.

FIG. 4 shows one embodiment of an operation to mark as unusable a memory location that produces erroneous computer information.

FIG. 5A shows one embodiment of a source code representation of an AML statement for a detected correctable error event.

FIG. 5B shows one embodiment of a source code representation of code interpreted by an ACPI driver to associate control methods with an ACPI device.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
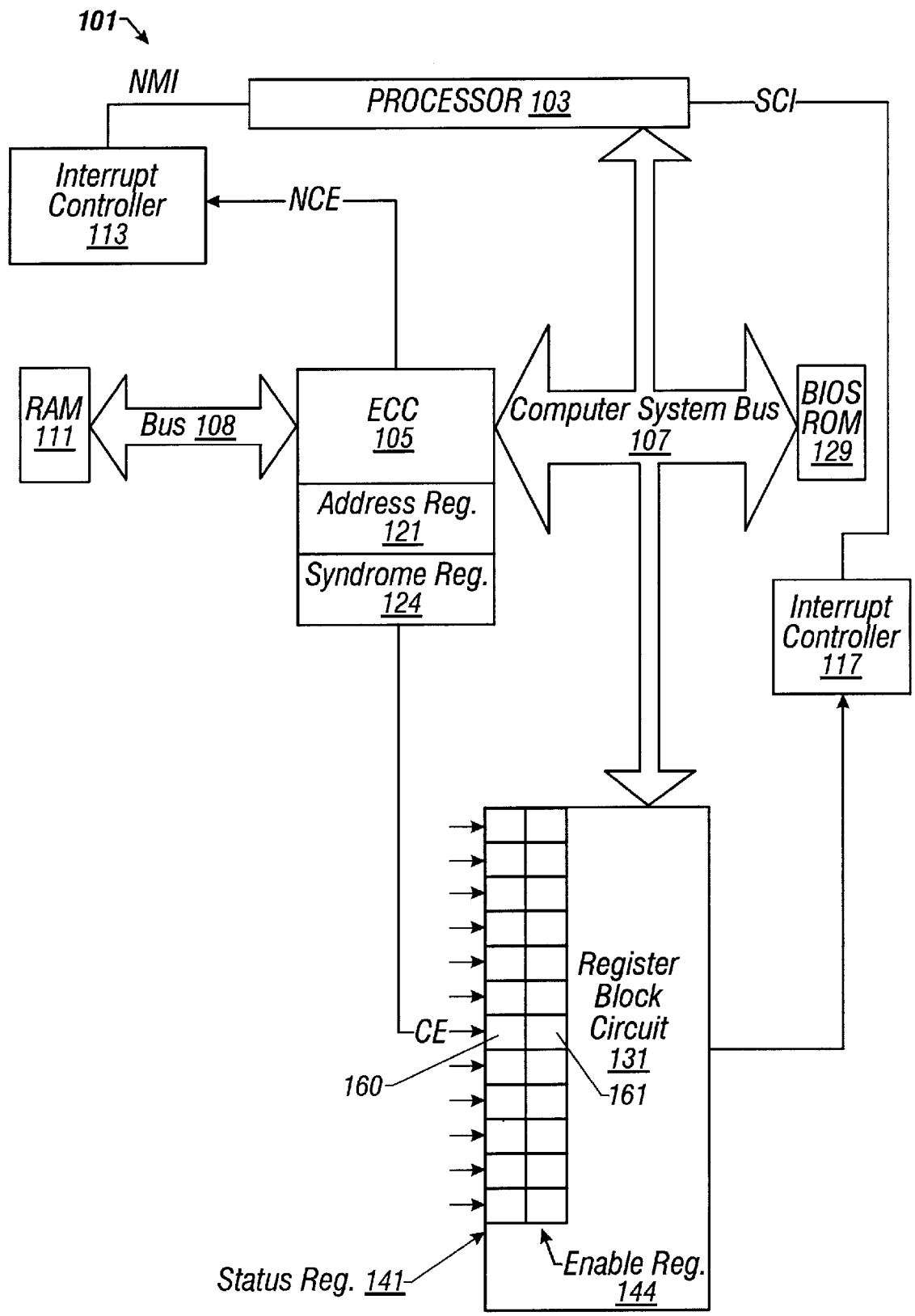
FIG. 1 is a block diagram of one embodiment of a computer system according to the present invention.

FIG. 1 is a block diagram of one embodiment of a computer system according to the present invention. Computer system 101 includes a processor 103 such as a system processor or central processing unit (CPU) that executes computer code to perform processor operations. In one embodiment, computer system 101 is a personal computer system and processor 103 is an X86 compatible processor such as a processor offered under the trade designation of PENTIUM by the INTEL Corporation. Processor 103 is operably coupled to an error check circuit 105 via a computer system bus 107. Computer system bus 107 includes address lines, data lines, and control lines for carrying memory addresses, computer information, and control signals, respectively to and from the error correction circuit 105 and to other components coupled to bus 107.

Error check circuit 105 is operably coupled to a computer system random access memory (RAM) 111 via a computer system bus 108. RAM 111 stores computer readable information which includes instructions that the processor 103 executes, operands of those executions, and the results of those executions. The processor 103 accesses the computer information in the RAM via the error check circuit 105. In one embodiment, the error check circuit 105 is part of a memory controller circuit that controls the flow of computer information between RAM 111 and processor 103. In one embodiment, RAM 111 includes a plurality of DRAM integrated circuit chips.

The error check circuit 105 checks the computer information flowing between RAM 111 and processor 103 to detect for errors in the computer information. In one embodiment, the error check circuit 105 performs error checking algorithms on the computer information such as 8 bit on 64 bit information unit error check code methods which detect and correct single bit errors (SBE) and detect multiple bit errors (MBE). The error check circuit 105 can detect in a computer information unit such as a 64 bit unit, both correctable errors (CE) such as single bit errors and non correctable errors (NCE). In one embodiment, the error check circuit 105 corrects the detected correctable errors and provides the corrected computer information to processor 103 or to RAM 111. In one embodiment, only single bit errors are correctable, wherein all multiple bit errors are non correctable. In other embodiments, the error check circuit 105 includes algorithms that can correct multiple bit errors in a computer information unit. In these embodiments, a correctable error (CE) would also include a correctable multiple bit error. In one embodiment, the error check circuit is implemented on a chipset offered under the trade designation of 440 BX by the INTEL CORPORATION.

The error check circuit 105 includes an address register 121 for storing the address of a location in the RAM 111 where the computer information unit having the detected error was stored. The error check circuit 105 also includes a syndrome register 124 for capturing and storing a syndrome of the computer information unit having the detected error. A syndrome of a computer information unit is a set of diagnostic bits used in determining the erroneous bit(s) in a computer information unit. In one embodiment, the syndrome of a computer information unit having no erroneous bits contains all logical zeros.

Upon detection of a non correctable error (NCE), the error check circuit 105 provides an indication that a non correctable error has occurred via an NCE signal to an interrupt controller 113. Upon receipt of the NCE signal indicating a non correctable error, the interrupt controller 113 generates a non maskable interrupt (NMI) to the system processor 103 to indicate that a non correctable error has been detected. In one embodiment, the NCE as well as the CE signals are each provided on output pins of the chipset implementing the error check circuit 105.

Computer system 101 includes a register block circuit 131 that is compatible with the ACPI standard. In one embodiment, block circuit 131 is a general purpose register block circuit and is implemented in a chipset. In one embodiment, the chipset is offered under the trade designation of PIIX4 by the INTEL CORPORATION. Block circuit 131 includes two registers, a status register 141 and an enable register 144. Register block circuit 131 is accessible by the processor 103 via the computer system bus 107. In one embodiment, register block circuit 131 is 32 bit aligned wherein status register 141 and enable register 144 are each accessed as a byte. Status register 141 and enable register 144 each include a plurality of bit-fields. In one embodiment, the bit-fields are one bit wide in size.

Each bit-field in the status register has an input for receiving an event signal indicating that a general purpose event (a type of ACPI event), either a level event or an edge-triggered event, has occurred or is active. One example of an event is the closing of a lid switch in a portable computer. The value in each of the bit-fields of the status register 141 indicates whether a particular event has become active or has occurred. In one embodiment, once the value of a particular bit-field of the status register changes in response to a corresponding event signal indicating that a corresponding event has occurred, the value of the bit field is "latched" wherein the value can only be reset by the processor writing binary one(s) to the particular bit-field. In one embodiment, a bit-field of the status register 141 may receive a cascaded signal indicating that any one of a plurality of events has occurred.

Status register 141 includes a bit-field 160 whose value is responsive to the CE signal. Bit-field 160 has an input that is operably coupled to the CE output of error check circuit 105.

Enable register 144 contains a plurality of bit-fields wherein each bit-field of the enable register 144 corresponds to a bit-field of the status register 141. When the value of a specific bit-field of the enable register 144 is set or indicates enablement, the output of the register block circuit 131 goes to an active level or provides an output signal indicating the occurrence of a general purpose event in response to the register block circuit 131 receiving a specific event signal indicating that a specific general purpose event has become active or has occurred. If the value of the specific bit-field of enable register 144 indicates non enablement, then the register block circuit 131 receiving the specific event signal indicating an active general purpose event will not provide an output signal or cause the output of register block circuit 131 to go to an active level.

In one embodiment, the output of the register block circuit 131 goes to an active level or provides an output signal in response to a specific bit-field of the enable register 144 having a value indicating enablement and in response to a specific corresponding bit-field of the status register 141 having a value indicating the occurrence of a general purpose event; wherein the value of the specific corresponding bit-field of the status register 141 has "latched" to indicate an active event in response to the bit-field receiving via its input a corresponding specific event signal indicating the occurrence of a specific event.

In another embodiment, the output of the block register 131 goes to an active level or provides an output signal in response to a specific bit-field of the enable register 144 having a value indicating enablement and in response to the receipt by the register block 131, via a specific input of the register block circuit, of a corresponding specific event signal indicating the occurrence of a specific event. In this embodiment, the value of the status register would become "latched" in response to receiving via its input the corresponding specific event signal to indicate to that the specific event has occurred.

Bit-field 161 of enable register 144 corresponds to bit-field 160 of status register 141. In one embodiment, processor 103 is capable of writing a value indicating enablement and a value indicating non enablement to each of the bit-fields in the enable register 144.

The output of the register block circuit 131 going active causes the interrupt controller 117 to generate a system controller interrupt (SCI) to processor 103. In one embodiment, the SCI is an active low, level-sensitive, sharable interrupt mapped to a declared interrupt vector. The SCI vector can be shared with other low-priority interrupts that have a low frequency of occurrence. The SCI is used by the register block 131 to notify the operating system of computer system 101 of the occurrence of an ACPI event or that an ACPI event has become active. In one embodiment, interrupt controllers 113 and 117 are the same interrupt controller.

Computer system 101 includes a basic input output system (BIOS) read only memory (ROM) 129 which in one embodiment is a flash ROM. BIOS ROM 129 stores sets of computer readable ACPI machine language (AML) code for the ACPI control methods.

Figure 2:
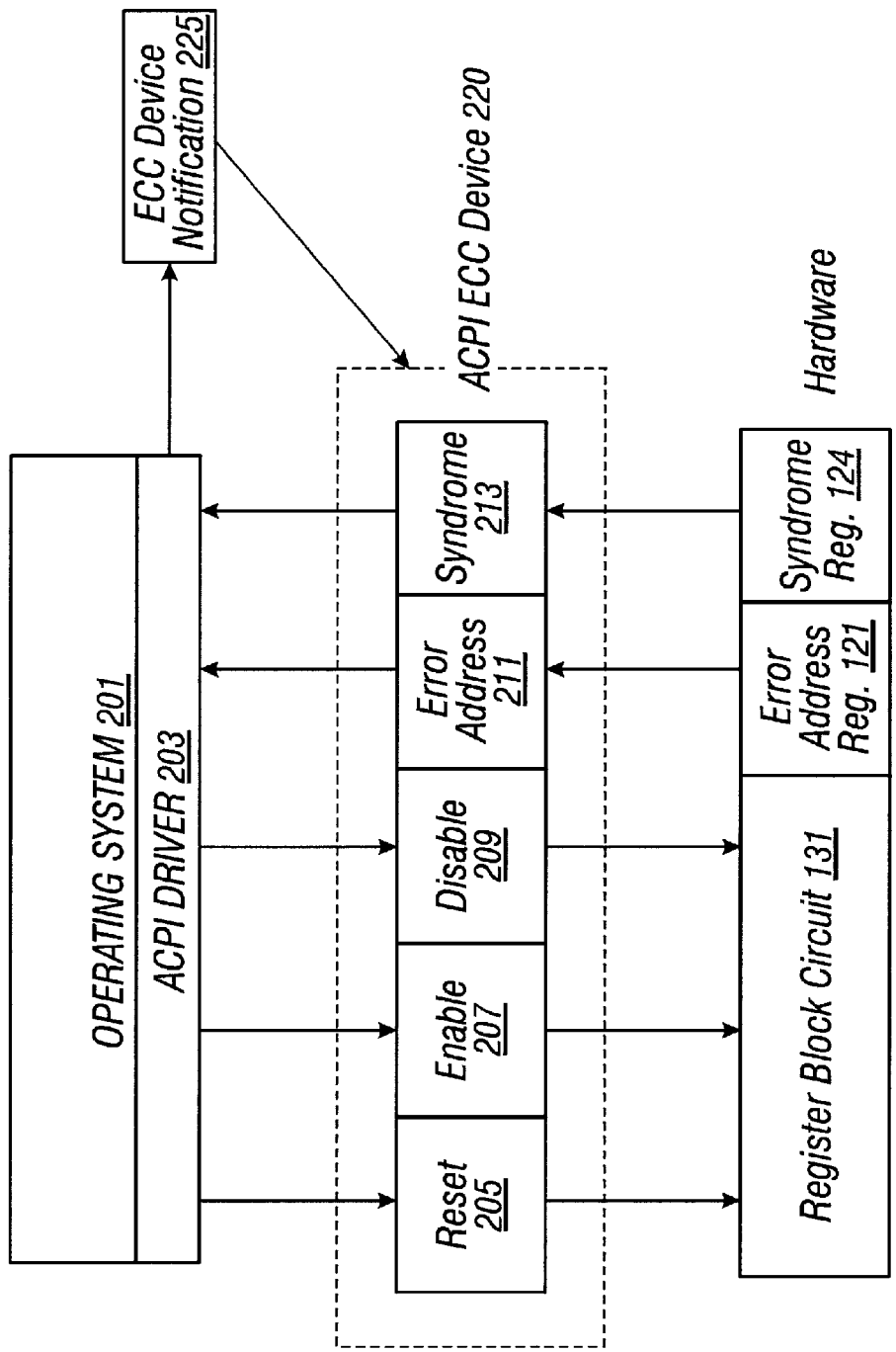
FIG. 2 is a diagrammatic representation of one embodiment of the relationship between an ACPI compatible operating system implemented in a computer system and hardware components in the computer system used to notify the operating system of a correctable error and to provide to the operating system with specific parameters of that error.

FIG. 2 is a diagrammatic representation of one embodiment of the relationship between an ACPI compatible operating system implemented in computer system and hardware components in the computer system used to notify the operating system of a detected correctable error and to provide to the operating system with specific parameters of that error.

Processor 103 executes code for the implementation of operating system 201 on the computer system 101. Operating system 201 includes an ACPI driver that implements the ACPI standard. The computer system 101 includes control methods error check circuit (ECC) device notification 225, reset 205, enable 207, disable 209, error address 211, and syndrome 213. Control methods reset 205, enable 207, disable 209, error address 211, and syndrome 213 are all associated with ACPI ECC-handler device (ECC device) 220.

A control method is a sequence of ACPI Machine Language (AML) code that an ACPI driver 203 of an ACPI-compliant operating system 201 interprets to perform a simple hardware task. When an operating system, or more specifically, an ACPI driver of the operating system, becomes aware of a general purpose ACPI event, it interprets the sequence of code specified by an associated control method to handle the event. For example, the operating system, or more specifically, the ACPI driver, may perform operations specified by a control method(s) to read the temperature of a thermal zone in the computer system. The ACPI driver interprets the AML code of a control method and instructs the processor 103 to execute predefined operations as indicated by the AML code. Control methods enable a computer system to utilize a variety of hardware component types while conforming to the ACPI standard and utilizing ACPI algorithms and monitoring applications.

When the ACPI driver becomes aware of an ACPI event, the ACPI driver interprets the AML handler associated with the ACPI event. For the occurrence of a general purpose event, the ACPI driver will schedule the interpretation of a control method associated with the event based on the position of the corresponding bit-field of the status register associated with the event. The ACPI driver interprets the control method associated with the bit-field position as specified in the system's AML code. The AML code, copied to RAM 111 from the BIOS ROM 129, includes a general purpose AML statement to provide notification to a general purpose handler device within the AML code such as ECC device 220. FIG. 5A shows one embodiment of a detected correctable error event AML statement to provide notification to ECC device 220 when bit-field 160 is contained in the bit-field X of status register 141.

The reset control method 205 resets the status register 141. In one embodiment, reset control method 205 resets the value in bit-field 160. In one embodiment, the reset control method 205 also resets the error check circuit 105 to allow the error check circuit to capture the address and syndrome for the next detected error. In other embodiments, the ACPI driver would interpret a separate reset control method to reset the error check circuit 105.

The enable control method 207 sets or writes a value indicating enablement to bit-field 161 of enable register 144 which corresponds to bit-field 160 of status register 141. During the startup of computer system 101, the processor, executing BIOS code, initializes the value of bit-field 161 to indicate non enablement. During the initialization of the ACPI driver 203, if the ACPI driver 203 senses the presence of ACPI ECC device 220, the ACPI driver 203 interprets the enable control method 207 to enable the register block circuit 131 to provide an output signal indicating a detected correctable error in response to receiving a CE signal. During the initialization of the ACPI driver 203, the ACPI driver 203 may also interpret the reset control method 205 to reset bit-field 160 to a known state.

The disable control method 209 writes a value indicating non-enablement to bit-field 161 of enable register 144 to disable the register block circuit 131 from providing an output signal indicating a detected correctable error in response to the CE signal, thereby preventing the generation of the SCI in response to the CE signal. The disable control method 209 may be utilized by an operating system in the event that the system is detecting an inordinate number of correctable errors. Because processing correctable errors may consume a significant portion of processor time, the operating system disables the notification feature in these instances so as to keep the system running at the fastest possible speed until the computer system can be shut down for repair.

The error address control method 211 enables the processor 103 to access the address register 121 of the error check circuit 105 to obtain the address in RAM 111 where the computer information unit having the detected correctable error was stored. The syndrome register control method 213 enables the processor to access the syndrome register 124 to obtain the syndrome of the computer information unit having the detected correctable error.

The ECC device notification control method 225 provides notification to ECC device 220 within the AML.

FIG. 3 shows the operation of one embodiment of a computer system in notifying the operating system of a detected correctable error. When the error check circuit 105 detects a correctable error such as a single bit error in a computer information unit, the error check circuit 105 sends the CE signal indicating a detected correctable error to register block circuit 131. Also, the error check circuit 105 stores in address register 121 the physical address of the location in RAM 111 where the computer information unit having the detected correctable error was stored. In addition, error check circuit 105 stores in the syndrome register 124, the syndrome of the computer information unit having the correctable error. In some embodiments, the error check circuit 105 corrects the correctable error and provides the computer information unit to the processor 103 or to RAM 111.

In 305, the register block circuit 131 receives the CE signal indicating the detection of the correctable error. Upon receipt of the CE signal via its input, bit-field 160 is latched in that the value of bit-field 160 is set to indicate the detection of a correctable error. In response to the register block circuit 131 receiving the CE signal (as determined, in one embodiment, by the value in 160 being set to indicate detection) and in response to bit-field 161 having a value indicating enablement, the register block circuit 131 provides an output signal to the interrupt controller 117 indicating the occurrence of an ACPI event. In 309, interrupt controller 117 generates an SCI to processor 103 in response to receiving the output signal indicating an ACPI event.

Upon receipt of the SCI from the interrupt controller, the ACPI driver 203 of the operating system 201 becomes aware of the occurrence of an ACPI event. In response, processor 103, in 313, as directed by the ACPI driver 203, accesses the status register 141 of the register block circuit 131 to determine which ACPI event caused the generation of the SCI or which ACPI event has occurred. In one embodiment, the ACPI driver obtains the I/O address of status register 141 and enable register 144 and then directs the processor 103 to access status register 141 and enable register 144. After reading the status register 141 and enable register 144, the ACPI driver logically "ANDs" the value of bit-fields 160 and 161 to determine whether the CE signal has been received by the register block circuit 131 and whether the receipt of the CE signal by the register block 131 contributed to the generation of the SCI.

After determining that the detected correctable error event has occurred, the ACPI driver interprets the AML control method associated with the detected correctable error event, the ECC device notification control method 225. The interpretation of the ECC device notification control method 225 notifies the ACPI driver that a change has occurred within the ACPI ECC device 220, and accordingly, the ACPI driver 203, and therefore the operating system 201, are notified of a detected correctable error.

In response to being notified of the detection of a correctable error, the ACPI driver 203 of operating system 201 associates and interprets control methods to handle the correctable error event. In one embodiment, the ACPI driver 203 accesses an ACPI table in RAM 111 memory that includes at least one ACPI ECC device such as device 220. Upon associating the ECC device 220 with the detected correctable error event, the ACPI driver 203 of operating system 201 interprets the control method(s) associated to device 220 wherein the ACPI driver 203 interprets the AML code of the control method(s) in RAM 111 to direct the processor 103 to perform or execute the functions or operations of the associated control methods. FIG. 5B shows a source code version of the code interpreted by the ACPI driver to associate the address control method 211, the syndrome control method 213, and the reset control method 205 with ECC device 220.

In 317, the ACPI driver 203 interprets the address control method 211 to obtain the memory address of the location in RAM 111 where the computer information unit having the detected correctable error was stored. In 321, the ACPI driver 203 interprets the syndrome control method 213 to obtain the syndrome of the computer information unit having the detected correctable error.

In 325, the ACPI driver 203 interprets the reset control method 205 to reset or "unlatch" bit-field 160 of status register 141. In one embodiment, the status register bit-field is reset or cleared by writing a logical one to the one bit wide bit-field. In another embodiment, the ACPI driver resets the status register without having to interpret a control method. Also in 325, the reset control method resets the error check circuit 105. In some embodiments, control method 325 is executed before control methods 317 and 321. In other embodiments, control method 321 may be performed before control method 317 or after control method 325.

After obtaining the memory address from the memory register 121 and the syndrome from the syndrome register 124, the operating system logs in RAM 111, a hard drive (not shown), or other storage media the obtained information. The operating system analyzes the obtained information with the addresses and syndromes of past correctable errors which are stored or logged in a memory to detect a pattern in the correctable errors that would indicate a problem with the memory 111, system buses 107 and 108, or other computer information handling components of computer system 101. For example, two detected errors producing the same memory address and syndrome would tend to indicate a faulty memory cell. Also, two detected errors having the same syndrome and having addresses that share the same columns in RAM 111 would indicate a faulty column. A substantial amount of correctable errors having different unrelated memory addresses but the same syndromes might indicate a faulty memory card or faulty computer system bus. Upon determining that a hardware component is faulty, the operating system would display an indication of the faulty condition to a user interface of the computer system indicating the determined problem.

FIG. 4 shows one embodiment of an operation to mark as unusable a memory location that produces erroneous computer information as determined by the analysis of the memory address and syndrome information. These operations are performed by the processor 103 executing the operating system software program. In 405, the operating system looks up in a page table, the memory block page that corresponds to the faulty memory location in RAM 111. In 407, the instructional and data caches of the processor 103 are flushed. In 409 the computer information stored in the memory block of RAM 111 associated with the page associated with the faulty memory location is copied or written to another memory block of RAM 111 associated with a second page. In 411, all references in the page table to the old page are rewritten to refer to the second page. In 412, the old page is marked as unusable in the page table.

In one embodiment, size of the memory page marked as unusable is 4 Kbytes. However, in other embodiments, other block sizes may be marked as unusable. Also in other embodiments, more than one page at a time may be marked as unusable.

Computer system 101 is able to detect faulty memory cells or entire columns and avoid using those faulty components by marking as unusable in a page table, the page that is associated with the faulty location. Although marking as unusable pages of a memory may slow down the execution speed of computer system 101, the computer system is able to function until a time when the computer system can be shut down and the faulty components repaired.

In other embodiments, the error check circuit 105 may include other registers that contain other types of diagnostic bits, including a bit indicating whether the error occurred during a read or write cycle. The computer system may include other control methods that the ACPI driver interprets to obtain the indications of these other diagnostic bits.

In other embodiments, computer system 101 may include other register block circuits that are ACPI compatible.

While particular embodiments of the present invention have been shown and described, it will be obvious to those skilled in the art that changes and modifications may be made without departing from this invention and its broader aspects and, therefore, the appended claims are to encompass within their scope all such changes and modifications as are within the true spirit and scope of this invention.

What is claimed is:

1. A computer system comprising:

a processor;

a memory;

an error check circuit operably coupled to the memory and to the processor, the error check circuit detecting correctable errors in computer information, the error check circuit providing an error signal indicative of a detected correctable error;

a register circuit including:
  a status register, the status register including a plurality of bit-fields, wherein the value of one of the bit-fields is responsive to the error signal;
  an enable register including a plurality of bit-fields, each bit-field of the plurality of bit-fields of the enable register corresponds to a bit-field of the plurality of bit-fields of the status register, wherein one of the bit-fields of the enable register is corresponding to the one of the bit-fields of the status register whose value is responsive to the error signal;

wherein when the one of the bit-fields of the enable register contains a value indicating enablement, an interrupt to the processor is generated in response to the register circuit receiving the error signal.

2. The computer system of claim 1 wherein the generation of the interrupt to the processor in response to the register circuit receiving the error signal includes the interrupt signal being generating in response to the one of the bit-fields of the status register containing a value indicating the receipt of the error signal.

3. The computer system of claim 1 wherein the size of the bit-fields of the status register is one bit wide.

4. The computer system of claim 1 wherein:

the register circuit is accessible by the processor to write a value indicating enablement and a value indicating non-enablement in the one of the bit-fields of the enable register corresponding to the one of the bit-fields of the status register whose value is responsive to the error signal.

5. The computer system of claim 1 wherein the processor is capable of writing a value indicating enablement and a value indicating non-enablement in each of the bit-fields of the enable register.

6. The computer system of claim 1 wherein after receiving the interrupt, the processor accesses the register circuit to determine that the register circuit received the error signal.

7. The computer system of claim 6 wherein the error check circuit further includes:

an address register storing a memory address of a location in the memory where the computer information having the detected correctable error was stored, wherein after determining that the register circuit received the error signal, the processor accesses the address register to obtain the memory address.

8. The computer system of claim 7 wherein after obtaining the memory address from the address register, the memory location corresponding to the memory address is indicated as unusable.

9. The computer system of claim 6 wherein the processor accessing the register circuit to determine that the register circuit received the error signal includes the processor reading the values of the bit-fields of the status register, wherein the value of the one of the bit-fields indicates that the register circuit received the error signal.

10. The computer system of claim 6 wherein the error check circuit further includes:

an syndrome register storing a syndrome of the computer information having the detected correctable error, wherein after determining that the register circuit received the error signal, the processor accesses the syndrome register to obtain the syndrome.

11. The computer system of claim 1 wherein the correctable error is a single bit error.

12. The computer system of claim 1 wherein the error check circuit corrects the detected correctable error.

13. The computer system of claim 1 wherein the interrupt is a system control interrupt (SCI).

14. A computer system comprising:

a processor, the processor executing code for the implementation of an operating system that implements an advanced configuration and power interface (ACPI) standard;

a memory;

an error check circuit operably coupled to the memory and to the processor, the error check circuit capable of detecting correctable errors in computer information, the error check circuit providing an error signal indicative of a detected correctable error;

a register block circuit compatible with the ACPI standard, the register block circuit including a plurality of inputs for receiving event signals indicating that a type of ACPI event has occurred or is active, in response to receiving the error signal, the register block circuit, when enabled, providing an output signal to notify the operating system of the detected correctable error.

15. The computer system of claim 14 wherein after the operating system is notified of a detected correctable error, the operating system interprets a control method to obtain, from the error check circuit, an address of a location in the memory where the computer information having the correctable error was stored.

16. The computer system of 15 wherein the operating system includes an ACPI driver, wherein the operating system interpreting a control method includes the ACPI driver interpreting the control method.

17. The computer system of claim 14 wherein after the operating system is notified of a correctable error, the operating system interprets a control method to obtain, from the error check circuit, a syndrome of the computer information having the detected correctable error.

18. The computer system of claim 14 wherein after the operating system is notified of a correctable error, the operating system interprets a control method to reset a register bit-field of the register block circuit, the register bit-field having a value responsive to the error signal.

19. The computer system of claim 14 wherein the register block circuit is a general purpose register block circuit.

20. A computer system comprising:
   a processor, the processor executing code for the implementation of an operating system that implements an advanced configuration and power interface (ACPI) standard;
   a memory;
   an error check circuit operably coupled to the memory and to the processor, the error check circuit capable of detecting correctable errors in computer information, the error check circuit providing an error signal indicative of a detected correctable error;
   a register block circuit compatible with the ACPI standard, in response to receiving the error signal, the register block circuit, when enabled, providing an output signal to notify the operating system of the detected correctable error,
   wherein the register block circuit providing the output signal to notify the operating system causes the generation of an interrupt to the processor, wherein in response, the processor accesses the register block circuit to determine that the output signal was provided in response to the register block circuit receiving the error signal, wherein the operating system is notified of the detected correctable error.

21. A method for notifying a computer system operating system implementing an advanced configuration and power interface (ACPI) standard of a detected correctable error comprising:

detecting a correctable error in computer information and providing an indication thereof in a bit-field of a status register of a register block circuit including a plurality of inputs for receiving event signals indicating that a type of ACPI event has occurred or is active;

generating an interrupt to a processor implementing an operating system if a bit-field of an enable register of the register block circuit corresponding to the bit-field of the status register indicates enablement;

accessing the status register to determine that the interrupt was generated in response to the detection of a correctable error.

22. The method of claim 21 further comprising:

obtaining an address of a location in a computer system memory in which the computer information having the detected correctable error was stored.

23. The method of claim 22 further comprising:

marking as unusable a block of the memory corresponding to the address.

24. The method of claim 22 wherein obtaining the address further includes:

executing a control method to obtain the address of the location in memory.

25. The method of claim 24 further comprising:

determining the control method from a plurality of control methods.

26. The method of claim 25 wherein the determining the control method includes accessing a table including an entry for the method, the entry corresponding to the bit-field of the status register.

27. The method of claim 21 further comprising:

resetting the bit-field of the status register after determining that the interrupt was generated in response to the detection of a correctable error.

28. The method of claim 21 further comprising:

obtaining a syndrome of the computer information having the correctable error.

29. The method of claim 28 wherein the step of obtaining includes executing ACPI machine language code originating from a read only memory (ROM).

* * * * *